(12) United States Patent
Arce (10) Patent No.: US 9,876,945 B2
(45) Date of Patent: Jan. 23, 2018

(54) COMPACT PORTABLE TELEPROMPTER AND ASSOCIATED SYSTEM AND METHOD

(71) Applicant: Brigham Arce, Provo, UT (US)

(72) Inventor: Brigham Arce, Provo, UT (US)

( * ) Notice: Subject to any disclaimer, the term of this patent is extended or adjusted under 35 U.S.C. 154(b) by 0 days.

(21) Appl. No.: 15/255,386

(22) Filed: Sep. 2, 2016

(65) Prior Publication Data
US 2017/0064158 A1 Mar. 2, 2017

Related U.S. Application Data (60) Provisional application No. 62/213,316, filed on Sep. 2, 2015.

(51) Int. Cl.
*H04N 5/222* (2006.01)
*H04N 5/225* (2006.01)
*H04N 5/232* (2006.01)

(52) U.S. Cl.
CPC ......... *H04N 5/2222* (2013.01); *H04N 5/2254* (2013.01); *H04N 5/23293* (2013.01)

(58) Field of Classification Search
CPC . H04N 5/2222; H04N 5/2254; H04N 5/23293
See application file for complete search history.

(56) References Cited

U.S. PATENT DOCUMENTS

| | | | | |
|---|---|---|---|---|
| 4,894,722 A * | 1/1990 | Suzuki | ................. | H04N 5/2222 348/333.02 |
| 5,790,194 A * | 8/1998 | Shimamura | .......... | H04N 5/2222 348/375 |
| 6,280,039 B1 * | 8/2001 | Barber | .................. | G03B 17/17 348/375 |
| 6,980,253 B1 * | 12/2005 | Matsui | ................. | H04N 5/2222 348/375 |
| 9,030,603 B1 * | 5/2015 | Vito | ..................... | H04N 5/2222 348/373 |
| 2002/0008774 A1 * | 1/2002 | Yata | .................... | H04N 5/2222 348/375 |
| 2002/0030758 A1 * | 3/2002 | Wasada | ................ | H04N 5/2222 348/375 |
| 2009/0256970 A1 * | 10/2009 | Bilbrey | ............... | H04N 5/2222 348/722 |
| 2011/0298935 A1 * | 12/2011 | Segal | .................... | H04N 5/265 348/207.1 |
| 2013/0329112 A1 * | 12/2013 | Dudkowski | .......... | H04N 5/2222 348/333.08 |
| 2014/0016030 A1 * | 1/2014 | Vito | .................... | H04N 5/2252 348/375 |
| 2014/0063469 A1 * | 3/2014 | Folcik | ................... | G03B 21/10 353/79 |
| 2015/0009402 A1 * | 1/2015 | Vito | .................... | H04N 5/2222 348/375 |

* cited by examiner

*Primary Examiner* — Timothy J Henn
(74) *Attorney, Agent, or Firm* — Kunzler, PC (57) ABSTRACT

A system for a teleprompter is disclosed herein. The teleprompter system comprises a handheld camera. The teleprompter system also comprises a lens, coupled to the handheld camera. The teleprompter system further comprises a teleprompter, removably coupled to the lens. The teleprompter system further comprises a mobile device, removably coupled to the teleprompter.

18 Claims, 7 Drawing Sheets

COMPACT PORTABLE TELEPROMPTER AND ASSOCIATED SYSTEM AND METHOD

CROSS-REFERENCE TO RELATED APPLICATION

This application claims the benefit of U.S. Provisional Patent Application No. 62/213,316, filed Sep. 2, 2015, which is incorporated herein by reference.

FIELD

This disclosure relates generally to teleprompters, and more particularly to teleprompters for use with a handheld camera.

BACKGROUND

Generally, teleprompters are electronic display devices that prompt a user (e.g., actor or speaker) with script to be read for various activities, such as video recordings and public speaking. Conventional teleprompters are large and heavy, and thus largely non-portable. More specifically, conventional teleprompters often require laborious set-up procedures and are difficult to relocate. Moreover, for proper use and storage, conventional teleprompters typically require a number of mounting accessories, protective storage containers, and expensive electronic displays.

SUMMARY

A need exists for a teleprompter that overcomes the shortcomings of conventional teleprompters. The subject matter of the present application has been developed in response to the present state of teleprompter art, and in particular, in response to problems and needs in the teleprompter art, such as those discussed above, that have not yet been fully solved. Accordingly, the embodiments of the present disclosure disclose a teleprompter and associated display modules overcome at least some of the shortcomings of conventional teleprompters.

A system for a teleprompter is disclosed herein. The teleprompter system comprises a handheld camera. The teleprompter system also comprises a lens, coupled to the handheld camera. The teleprompter system further comprises a teleprompter, removably coupled to the lens. The teleprompter system further comprises a mobile device, removably coupled to the teleprompter. The preceding subject matter of this paragraph characterizes example 1 of the present disclosure.

The teleprompter is co-movably coupled with a portion of the lens such that the teleprompter moves with the portion of the lens as the portion of the lens moves relative to the handheld camera. The preceding subject matter of this paragraph characterizes example 2 of the present disclosure, wherein example 2 also includes the subject matter according to example 1, above.

The teleprompter is removably coupled directly to the lens. The preceding subject matter of this paragraph characterizes example 3 of the present disclosure, wherein example 3 also includes the subject matter according to any one of examples 1 to 2, above.

The lens comprises first threads. The teleprompter comprises second threads. The second threads of the teleprompter are threadably engaged with the first threads of the lens. The preceding subject matter of this paragraph characterizes example 4 of the present disclosure, wherein example 4 also includes the subject matter according to example 3, above.

The first threads of the lens are filter threads configured to threadably engage a filter of the lens. The preceding subject matter of this paragraph characterizes example 5 of the present disclosure, wherein example 5 also includes the subject matter according to example 4, above.

The teleprompter system according to claim 1, further comprises an adapter interposed between the lens and the teleprompter. The lens comprises first threads. The teleprompter comprises second threads. The adapter comprises third threads and fourth threads. The third threads of the adapter are threadably engaged with the first threads of the lens. The fourth threads of the adapter are threadably engaged with the second threads of the teleprompter. The preceding subject matter of this paragraph characterizes example 6 of the present disclosure, wherein example 6 also includes the subject matter according to any one of examples 1 to 2, above.

The handheld camera is one of a digital single lens reflex (SLR) camera or a digital mirrorless camera. The preceding subject matter of this paragraph characterizes example 7 of the present disclosure, wherein example 7 also includes the subject matter according to any one of examples 1 to 6, above.

The teleprompter comprises a cover. The teleprompter also comprises a mirror, fixedly retained within the cover. The teleprompter further comprises a mobile device mount, adjustably movably coupled with the cover to clamp the mobile device between the cover and the mobile device mount. The preceding subject matter of this paragraph characterizes example 8 of the present disclosure, wherein example 8 also includes the subject matter according to any one of examples 1 to 7, above.

The mobile device comprises a display that has a maximum diagonal dimension equal to or less than about seven inches. The preceding subject matter of this paragraph characterizes example 9 of the present disclosure, wherein example 9 also includes the subject matter according to any one of examples 1 to 8, above.

The teleprompter has maximum dimensions equal to or less than about 15×12×12 cm. The preceding subject matter of this paragraph characterizes example 10 of the present disclosure, wherein example 10 also includes the subject matter according to any one of examples 1 to 9, above.

A teleprompter, for removably coupling with a handheld camera and a mobile device, is disclosed herein. The teleprompter comprises a cover, partially peripherally enclosing a space and comprising a proximal open end and a distal open end opposite the proximal open end. The teleprompter also comprises a mirror, located within the space between the proximal open end and the distal open end. The teleprompter further comprises a mobile device mount, adjustably movably coupled with the cover to fully peripherally enclose the space. The preceding subject matter of this paragraph characterizes example 11 of the present disclosure.

The mobile device mount is movable between an open position and a closed position. In the open position, the mobile device is insertable between the cover and the mobile device mount. In the closed position, the mobile device, inserted between the cover and the mobile device mount, is clamped by the cover and the mobile device mount. The preceding subject matter of this paragraph characterizes example 12 of the present disclosure, wherein example 12 also includes the subject matter according to example 11, above.

The mobile device mount comprises a shelf, defining a flat surface. The mobile device mount further comprises an adjustment mechanism. The mobile device mount is configured to concurrently maintain an orientation of the flat surface relative to the mirror and move the shelf toward the cover in a first direction parallel to the proximal open end of the cover to locate the mobile device mount in the closed position. The mobile device mount is configured to concurrently maintain an orientation of the flat surface relative to the cover and move the shelf away from the cover in a second direction, opposite the first direction, parallel to the proximal open end of the cover to locate the mobile device mount in the open position. The preceding subject matter of this paragraph characterizes example 13 of the present disclosure, wherein example 13 also includes the subject matter according to example 12, above.

The adjustment mechanism comprises at least one rod, non-movably fixed to the shelf. The adjustment mechanism also comprises at least one rail, non-movably fixed to the cover. At least the one rod is retained within and movable along at least the one rail. The preceding subject matter of this paragraph characterizes example 14 of the present disclosure, wherein example 14 also includes the subject matter according to example 13, above.

The teleprompter comprises a proximal end cap removably coupleable with the proximal open end. The teleprompter further comprises a distal end cap removably couplable with the distal open end. When removably coupled with the proximal open end and the distal open end, respectfully, the proximal end cap and distal end cap fully enclose the space. The preceding subject matter of this paragraph characterizes example 15 of the present disclosure, wherein example 15 also includes the subject matter according to any one of examples 11 to 14, above.

The mobile device mount comprises a shelf, configured to support the mobile device thereon. When the mobile device mount fully peripherally encloses the space, the distal end cap receives at least a portion of the shelf when the distal end cap is removably coupled with the distal open end of the cover. The preceding subject matter of this paragraph characterizes example 16 of the present disclosure, wherein example 16 also includes the subject matter according to example 15, above.

The proximal open end of the cover comprises a camera interface, configured to directly interface with a lens coupled to the handheld camera. The preceding subject matter of this paragraph characterizes example 17 of the present disclosure, wherein example 17 also includes the subject matter according to any one of examples 11 to 16, above.

The handheld camera interface of the proximal open end of the cover comprises second threads, threadably engageable with first threads of the lens. The preceding subject matter of this paragraph characterizes example 18 of the present disclosure, wherein example 18 also includes the subject matter according to example 17, above.

The teleprompter comprises an adapter, comprising third threads and fourth threads. The proximal open end of the cover comprises second threads. The third threads of the adapter are threadably engageable with first threads of a lens coupled to the handheld camera. The fourth threads of the adapter are threadably engageable with the second threads of the proximal open end of the cover. The preceding subject matter of this paragraph characterizes example 19 of the present disclosure, wherein example 19 also includes the subject matter according to any one of examples 11 to 17, above.

A method of teleprompting script to a user is disclosed herein. The method comprises removably coupling a teleprompter to a lens of a handheld camera via threaded engagement with threads of the lens of the handheld camera. The method also comprises releasably securing a mobile device to the teleprompter. The method further comprises scrolling script on a display of the mobile device. The method further comprises reflecting the script, from the display, off of a mirror of the teleprompter. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1A:
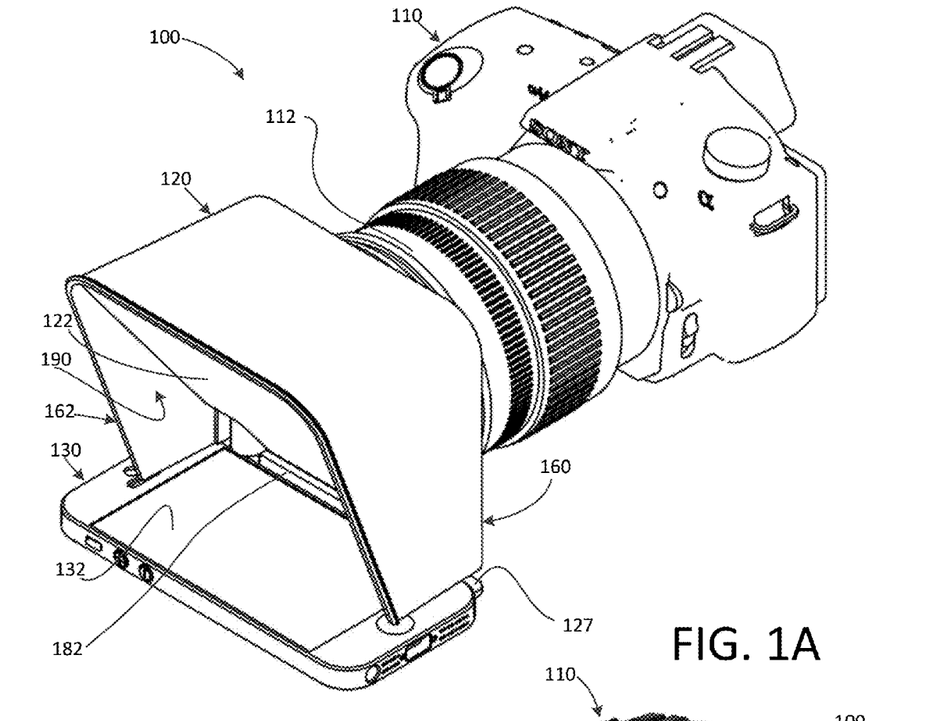
FIG. 1A is a perspective view of a teleprompter system including a camera, a teleprompter, and a mobile device, according to one or more embodiments of the present disclosure.
Figure 1B:
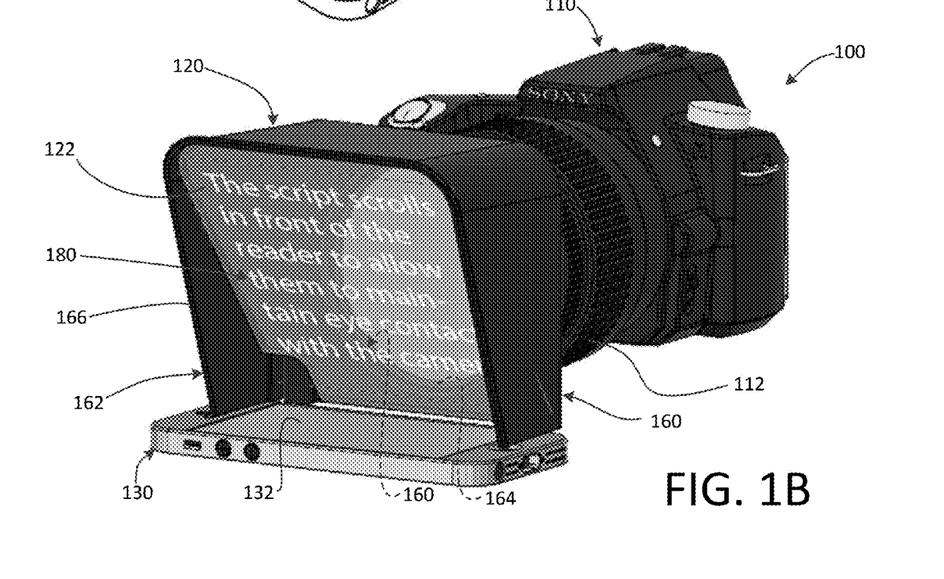
FIG. 1B is a perspective view of a teleprompter system including a camera, a teleprompter, and a mobile device, according to one or more embodiments of the present disclosure.
Figure 2A:
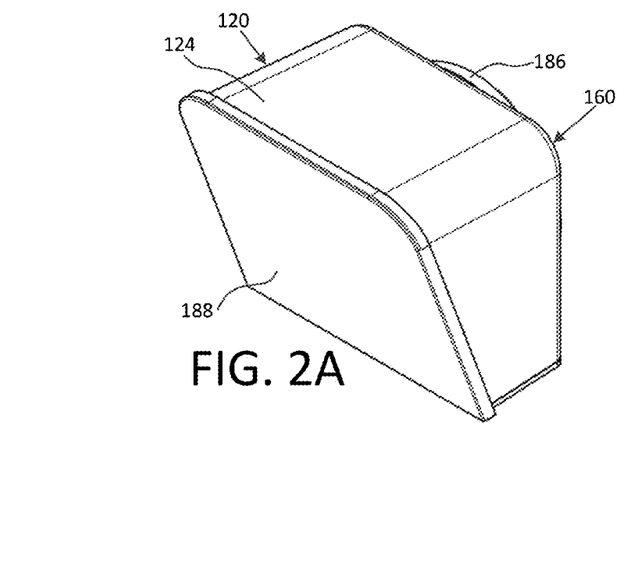
FIG. 2A is a perspective view of a teleprompter, shown with front and back covers, according to one or more embodiments of the present disclosure.
Figure 2B:
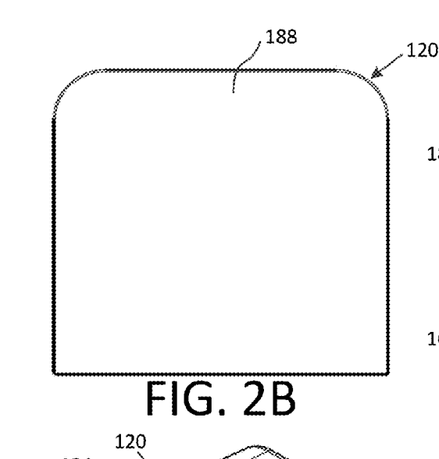
FIG. 2B is a front view of the teleprompter of FIG. 2A, according to one or more embodiments of the present disclosure.
Figure 2C:
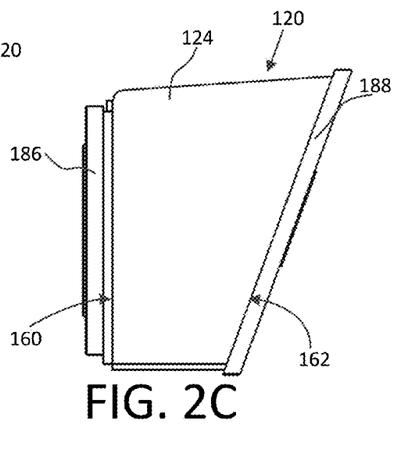
FIG. 2C is a side view of the teleprompter of FIG. 2A, according to one or more embodiments of the present disclosure.
Figure 2D:
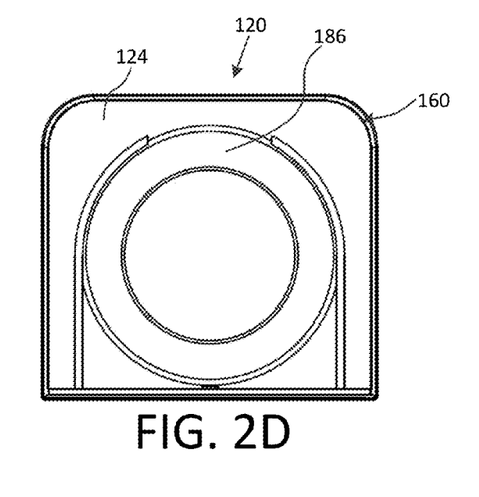
FIG. 2D is a back elevation view of the teleprompter of FIG. 2A, according to one or more embodiments of the present disclosure.

Referring to FIGS. 1A and 1B, a teleprompter system 100 includes a camera 110, a teleprompter 120, and a mobile device 130. The teleprompter 120 is removably coupled to a lens 112, which is coupled to the camera 110. Similarly, the mobile device 130 is removably coupled to the teleprompter 120. Generally, as shown in FIG. 1B, the teleprompter 120 locates the mobile device 130 relative to a mirror 122 of the teleprompter 120 such that script displayed on the mobile device is reflected off the mirror 122 and visible to a user whose image is being captured by the camera 110. The teleprompter 120 is removably coupled to the camera 110 such that the camera 110 captures the image of the user through the mirror 122 of the teleprompter 120. In this manner, script 180 can be teleprompted to a user, whose image is being captured by the camera 110, in a portable and compact package that allows the user to look directly into the lens 112 coupled to the camera 110 as he/she is reading the script 180 teleprompted by the teleprompter 120. As will be evident in view of the subject matter disclosed herein, the compact size and simple mounting procedure associated with the teleprompter system 100 decreases the time and effort necessary to disassemble, relocate, assemble, and reuse the teleprompter 120.

Figures 4A, 4B:
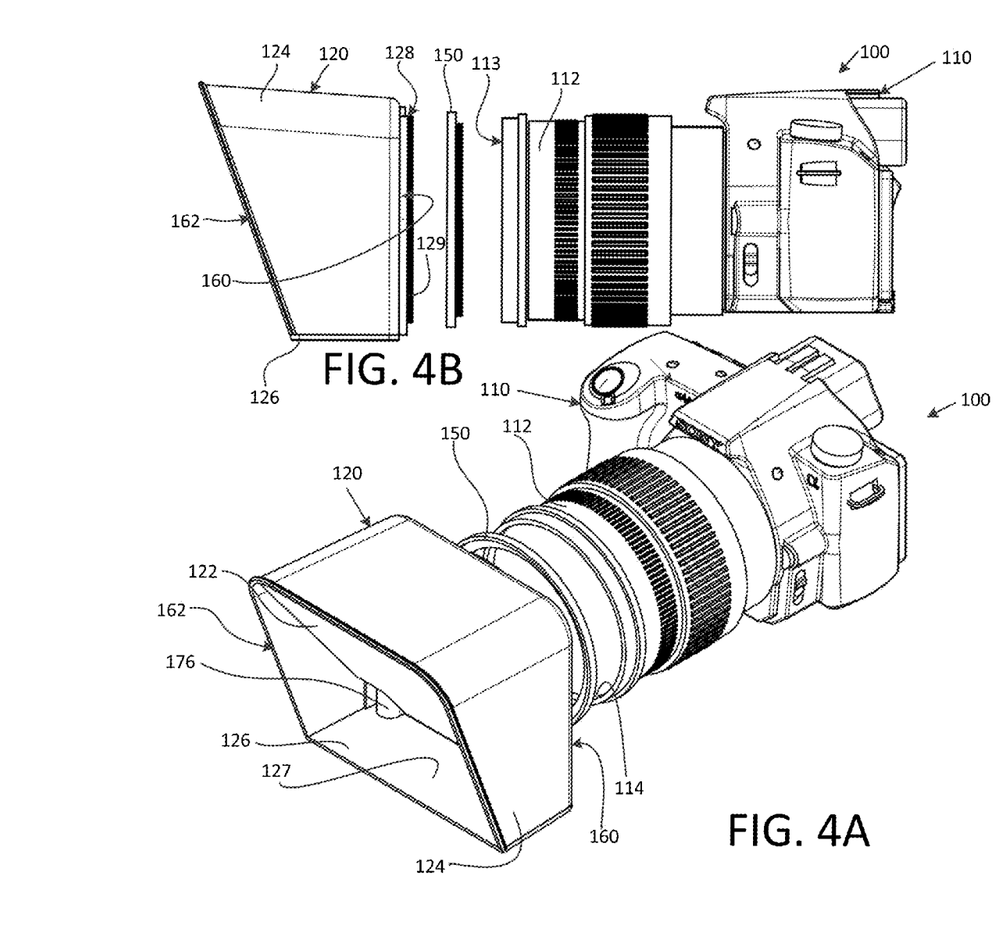
FIG. 4A is an exploded perspective view of a teleprompter system, including a camera and teleprompter, according to one or more embodiments of the present disclosure.
FIG. 4B is an exploded side view of the teleprompter system of FIG. 4A, according to one or more embodiments of the present disclosure.

The camera 110 can be any of various cameras configured to capture video images. In some implementations, as depicted in the figures, the camera 110 is a handheld camera, such as a digital single lens reflex (SLR) camera or a digital mirrorless camera (which does not have a single reflex lens mirror) operable to capture still and video images. However, in other implementations, the camera 110 is a handheld video camera, such as a camcorder. The camera 110 has a lens 112 through which images are captured. Moreover, the lens 112 is configured to removably receive a filter (not shown) which can alter the lighting characteristics of the image being captured. Accordingly, as shown in FIG. 4A, the lens 112 includes engagement features 114, such as internal threads or first threads, pre-formed into the lens 112 and configured to removably engage corresponding engagement features, such as external threads, on the filter. In this manner, a filter can be removably coupled to the lens 112 of the camera 110 when desired, such as by screwing the filter onto the lens 112, and be removed or decoupled from the lens 112 when not desired, such as by unscrewing the filter from the lens 112. Although a filter has been described, the engagement features 114 can be used to removably couple other accessories, such as adapters and lens caps, to the lens 112.

The teleprompter 120 includes the mirror 122, a cover 124 or shroud, and a mobile device mount 126. The mirror 122 is fixedly retained within the cover 124 at an angle relative to the mobile device mount 126. The cover 124 partially circumferentially or peripherally encloses a space 190 within which the mirror 122 is located to help shade, or reduce light on, the mirror 122. Reducing light on the mirror 122 promotes the viewability of the script 180 being reflected by the mirror 122. Generally, as shown in FIGS. 1A, 1B, 4A, and 4B, the outer peripheries of the cover 124 and the mobile device mount 126 define the form factor or footprint of the teleprompter 120, which is only marginally larger than the form factor of the lens 112, in some implementations, and approximately equal to or smaller than the form factor of the camera 110, in some implementations. For example, in some implementations, the cross-sectional area of the teleprompter along a plane parallel to the proximal open end 160 is less than 15%, less than 10%, or less than 5% greater than the cross-sectional area of the lens 112 along a plane parallel to the distal end 113 of the lens 112. Furthermore, in some implementations, the cross-sectional area of the teleprompter along a plane parallel to the proximal open end 160 is less than the cross-sectional area of the camera 110 along the plane parallel to the distal end 113 of the lens 112 when the lens 112 is coupled to the camera 110. According to yet certain implementations, the teleprompter 120 has maximum dimensions equal to or less than about 15×12×12 cm, or equal to or less than about 12×10×8 cm. In some implementations, the mirror 122, when viewed from the front (e.g., FIG. 5C), has a maximum diagonal dimension equal to or less than about 7 inches.

Therefore, the teleprompter 120 has a compact design, which promotes the transportability of the teleprompter 120, such as when moving between different video shoots, by reducing or eliminating the need to transport separate storage cases, mounting hardware, or bulky protective boxes. Moreover, the compact size of the teleprompter 120, and associated handheld camera 110, greatly reduces the weight of the teleprompter system 100 compared to conventional teleprompter systems and virtually eliminates the need for extra mounting hardware. The lighter weight of the teleprompter 120 allows the teleprompter 120 to be mounted directly onto the lens 112 of the camera 110. Additionally, the reduced size of the teleprompter 120 reduces unwanted "vignette" or interference in the field of view of the camera 110. In one embodiment, the cover 124 is made of a rigid material, such as a hardened plastic or other rigid polymer.

Coupled to, or formed in, the cover 124 is a camera interface 128 that is configured to interface with the lens 112 of the camera 110. The camera interface 128 includes engagement features 129, such as external threads or second threads, which, in some embodiments, can be removably engaged with the engagement features 114 of the lens 112. For example, the teleprompter 120 can be removably coupled to the lens 112 of the camera 110 when desired, such as by screwing the teleprompter 120 onto the lens 112, and be removed or decoupled from the lens 112 when not desired, such as by unscrewing the teleprompter 120 from the lens 112. In such an example, the camera interface 128 is shaped and sized to complement the shape and size of the lens 112. However, to accommodate differently sized lenses, the teleprompter system 100 includes an adapter 150 in some embodiments (see, e.g., FIGS. 4A and 4B). The adapter 150 includes first engagement features, such as third threads, particularly configured to removably engage and complement the engagement features 114 of the lens 112 and second engagement features, such as fourth threads, opposing the first engagement features, configured to removably engage and complement the engagement features 129 of the camera interface 128 of the teleprompter 120. Accordingly, the adapter 150 can be interposed between the teleprompter 120 and the camera 110 to facilitate removably coupling together the teleprompter 120 and the camera 110.

As described above, the teleprompter 120 is fixed to a distal end 113 of the lens 112 such that the teleprompter 120 moves as the distal end 113 of the lens 112 moves, relative to a proximal end of the lens 112, such as when the lens 112 is used to zoom in on a subject. In other words, because the teleprompter 120 is directly or indirectly (via the adapter 150) attached to the distal end 113 of the lens 112, the teleprompter 120 moves relative to the camera 110 as the distal end 113 of the lens 112 moves relative to the camera 110. Because the teleprompter 120 has a relatively small form factor compared to the camera 110 and is lightweight, such co-movement of the teleprompter 120 and the lens 112, relative to the camera 110, is achievable.

The cover 124 has a proximal open end 160 and a distal open end 162. The proximal open end 160 defines a through aperture 164 sized and shaped to complement the aperture of the lens 112. In one implementation, the through aperture 164 of the proximal open end 160 has a circular shape and is roughly the same size as the distal end of the lens 112. In contrast, the distal open end 162 defines a through aperture 166 that is larger than the through aperture 164 of the proximal open end 160. Generally, the through aperture 164 defines the size of the mirror 122 and thus the surface area available for script. The through aperture 166 in the distal open end 162 has a substantially 4-sided polygonal shape (e.g., square). Moreover, as shown in FIG. 4A, the distal open end 162 is angled relative to the proximal open end 160, which is parallel to the distal end 113 of the lens 112. Accordingly, the distal open end 162 of the cover 124 is angled relative to the distal end 113 of the lens 112 of the camera 110.

The acute angle defined between the distal open end 162 and proximal open end 160 is greater than the acute angle defined between the mirror 122 and the proximal open end 160. For example, in one implementation, the acute angle defined between the distal open end 162 and proximal open end 160 is greater than 45-degrees (e.g., 60-degrees) and the acute angle defined between the mirror 122 and the proximal open end 160 is equal to 45-degrees. The mirror 122 is retained within the cover 124 at the angle relative to the proximal open end 160 via any of various fixation techniques, such as fastening, bonding, adhesion, etc.

The mirror 122 is a beam-splitter mirror configured to reflect script received from the mobile device 130 without the camera 110 capturing the script 180 reflected off of the mirror 122. In other words, the mirror 122 allows a user to read the script 180 reflected off of the mirror 122 while the user maintains eye contact with the camera 110 and while the camera records the user without the script 180 appearing in the captured image or images. In one implementation, the mirror 122 includes glass with a beam-splitter coating applied to one side of the glass. The beam-splitter coating reflects light from the mobile device 130, due to the particular angle and placement of the mobile device 130 relative to the mirror 122 and lens 112 (e.g., 45-degrees relative to the mirror 122 and perpendicular relative to the distal end 113 of the lens 112), but allows all other light to pass through the glass and into the lens 112 of the camera 110.

The mobile device mount 126 is adjustably movably coupled with the cover 124 via an adjustment mechanism 170. Generally, the mobile device mount 126 includes a shelf 172 that defines a substantially flat surface 127 for supporting the mobile device 130 thereon. When in a closed position, the surface 127 of the shelf 172 is oriented perpendicularly relative to the proximal open end 160 of the cover 124 and thus at a 45-degree angle relative to the mirror 122. In one implementation, the adjustment mechanism 170 maintains the orientation of the shelf 172 relative to the proximal open end 160 and the mirror 122 while allowing for adjustment of the shelf 172 toward and away from the cover 124 in opposing directions parallel to the proximal open end 160 of the cover 124. In this manner, in such an implementation, a mobile device, such as the mobile device 130, supported on the shelf 172 also is maintained perpendicularly relative to the proximal open end 160 of the cover 124 and at a 45-degree angle relative to the mirror 122 as the shelf 172 is moved toward and away from the cover 124.

Figure 5A:
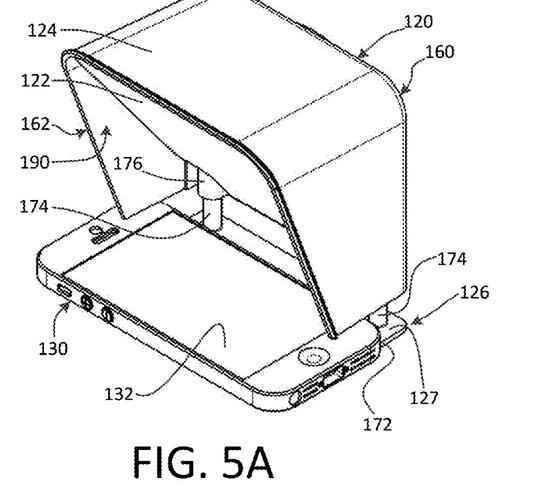
FIG. 5A is a perspective view of a teleprompter system, including a camera, teleprompter, and mobile device, shown with the teleprompter in an open position, according to one or more embodiments of the present disclosure.
Figure 5B:
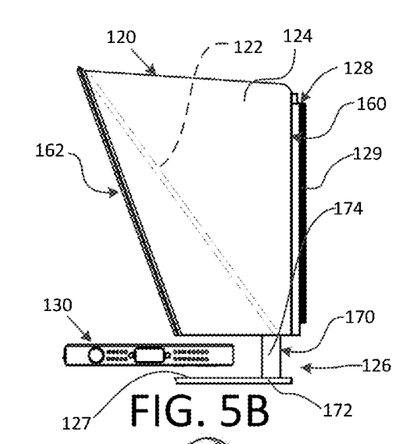
FIG. 5B is a side elevation view of the teleprompter system of FIG. 5A, according to one or more embodiments of the present disclosure.
Figure 5C:
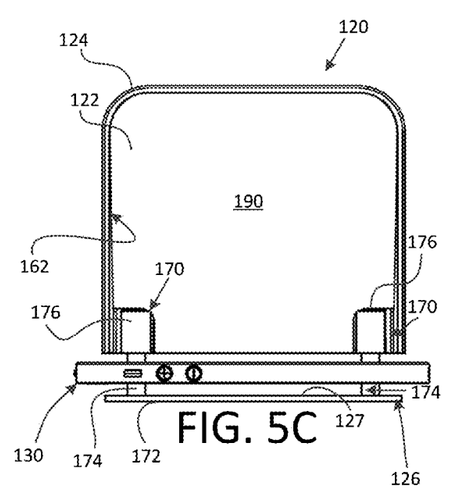
FIG. 5C is a front view of the teleprompter system of FIG. 5A, according to one or more embodiments of the present disclosure.

Generally, the shelf 172 is movable toward the cover 124 into a closed position (see, e.g., FIGS. 6A-C) and away from the cover 124 into an open position (see, e.g., FIGS. 5A-C). Although the shelf 172 has a substantially broad and flat surface 127, in other embodiments, the shelf 172 can have any of various types of surfaces or support features configured to maintain the mobile device 130 perpendicularly relative to the proximal open end 160 of the cover 124 and at a 45-degree angle relative to the mirror 122.

The adjustment mechanism 170 can be any of various adjustment mechanisms configured to selectively move the shelf 172 between the open and closed positions. In one embodiment, the adjustment mechanism 170 includes one or more rods 174 non-movably fixed to (e.g., co-formed with)

the shelf 172 and one or more rails 176 or channels non-movably fixed to (e.g., co-formed with) the cover 124. The rods 174 are retained within and movable along the rails 176 to move the shelf 172 between the open and closed positions. Engagement between the rods 174 and the rails 176 allows the shelf 172 to remain in the open position or closed position until a force or action is applied to the adjustment mechanism 170 to release or allow the shelf 172 to move out of the open position or closed position. For example, frictional engagement between the rods 174 and the rails 176 may be sufficient to hold the shelf 172 in place in the open position or closed position, such that the shelf 172 remains in the open position or closed position until a force sufficient to overcome the frictional force between the rods 174 and the rails 176 is applied to the shelf 172. In another example, the adjustment mechanism 170 may include biasing elements (e.g., springs) between the rods 174 and the rails 176 that biases the shelf 172 into the open position and further include a locking mechanism that locks the shelf 172 in the closed position by locking the position of the rods 174 relative to the rails 176. Then, the locking mechanism can be unlocked, such as by manual actuation of a lever or button, to allow the bias of the biasing element to urge the shelf 172 back into the open position. Alternatively, the biasing elements can be configured to bias the shelf 172 into the closed position. According to yet another example, the rods 174 may be engaged with the rails 176 via a ratcheting engagement that allows selective movement of the shelf 172 relative to the cover 124 between the open position and closed position.

Although in the illustrated embodiment, the rods 174 are fixed to the shelf 172 and the rails 176 are fixed to the cover 124, in other embodiments, the rods 174 are fixed to the cover 124 and the rails 176 are fixed to the shelf 172. Furthermore, although the adjustment mechanism 170 includes rods and rails that maintain the orientation of the shelf 172 relative to the mirror 122 as the shelf 172 translationally moves between the open and closed positions, in other embodiments, other adjustment mechanisms can be used to either maintain the orientation of the shelf 172 relative to the mirror 122 as the shelf 172 translationally moves between the open and closed positions or allow the orientation between the shelf 172 and the mirror 122 to change as the shelf 172 moves (e.g., rotates) between open and closed positions. In other words, as long as in the closed position the mobile device 130 is securely supported by the shelf 172 in an orientation that is perpendicular relative to the proximal open end 160 of the cover 124 and at a 45-degree angle relative to the mirror 122, any of various adjustment mechanisms and techniques can be used. Moreover, in certain implementations, with the shelf 172 in the closed position, the adjustment mechanism 170 is contained within the enclosure defined collectively by the cover 124 and the shelf 172.

The shelf 172 may include at least one stop 182 or guard rail for properly positioning the mobile device 130 on the shelf 172. The stop 182 can be attached to or co-formed with the shelf 172. In use, the mobile device 130 can be positioned on the shelf 172 such that the mobile device 130 abuts up against the stop 182 to ensure the mobile device 130 is positioned such that the script on the display 132 of the mobile device 130 is located properly under the mirror 122 and the mobile device 130 does not obstruct the images captured by the camera 110.

Figure 6A:
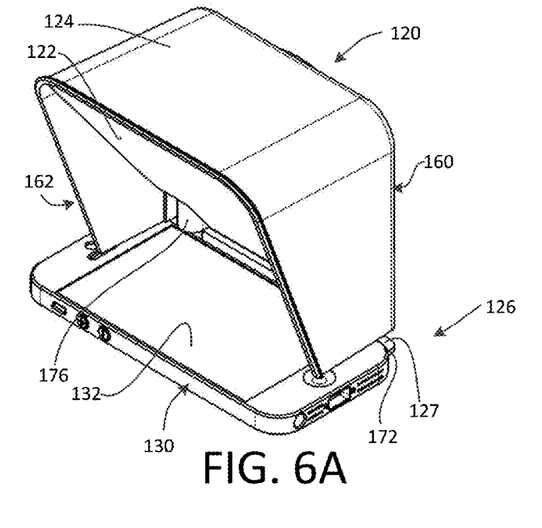
FIG. 6A is a perspective view of the teleprompter system of FIG. 5A, shown with the teleprompter in a closed position, according to one or more embodiments of the present disclosure.
Figure 6B:
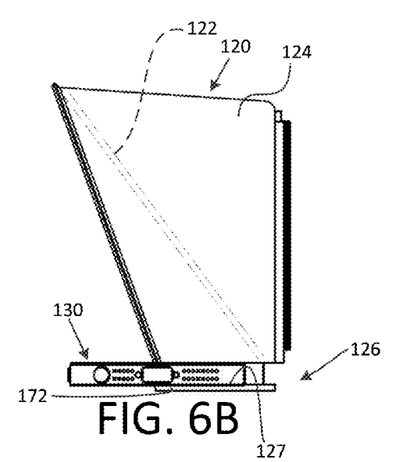
FIG. 6B is a side elevation view of the teleprompter system of FIG. 6A, according to one or more embodiments of the present disclosure.
Figure 6C:
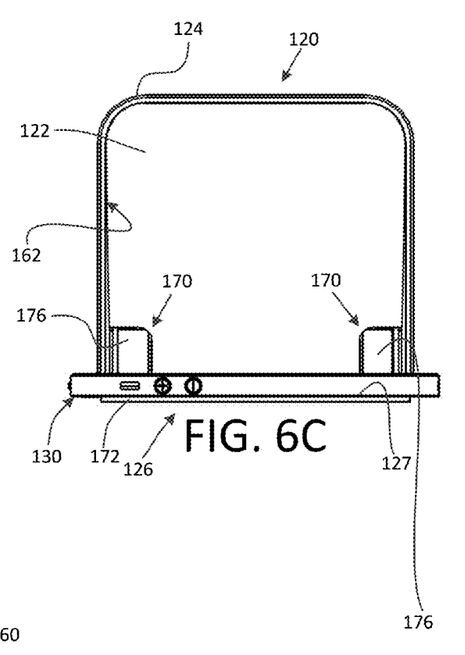
FIG. 6C is a front view of the teleprompter system of FIG. 6A, according to one or more embodiments of the present disclosure.

Referring to FIGS. 5A-C, with the shelf 172 in the open position, the mobile device 130 can be placed between the shelf 172 and the cover 124, such as within a space defined between the shelf 172 and the cover 124. Then, as shown in FIGS. 6A-C, with the mobile device 130 positioned between the shelf 172 and the cover 124, the shelf 172 can be placed in the closed position to effectively clamp the mobile device 130 between the shelf 172 and the cover 124. The clamping action of the shelf 172 and the cover 124 (e.g., contacting and applying opposing forces to the mobile device 130) helps to securely retain the mobile device 130 in place relative to the teleprompter 120, and more specifically relative to the mirror 122 of the teleprompter 120. In some implementations, the shelf 172 and/or the cover 124 may include features, such as surface textures, compliant layers or coatings, or other grip-enhancing elements, that promote retention of the mobile device 130 between the shelf 172 and the cover 124. Additionally, external features, such as straps, brackets, buckles, latches, and the like, can be used to promote the retention of the mobile device 130 between the shelf 172 and the cover 124.

Figure 3A:
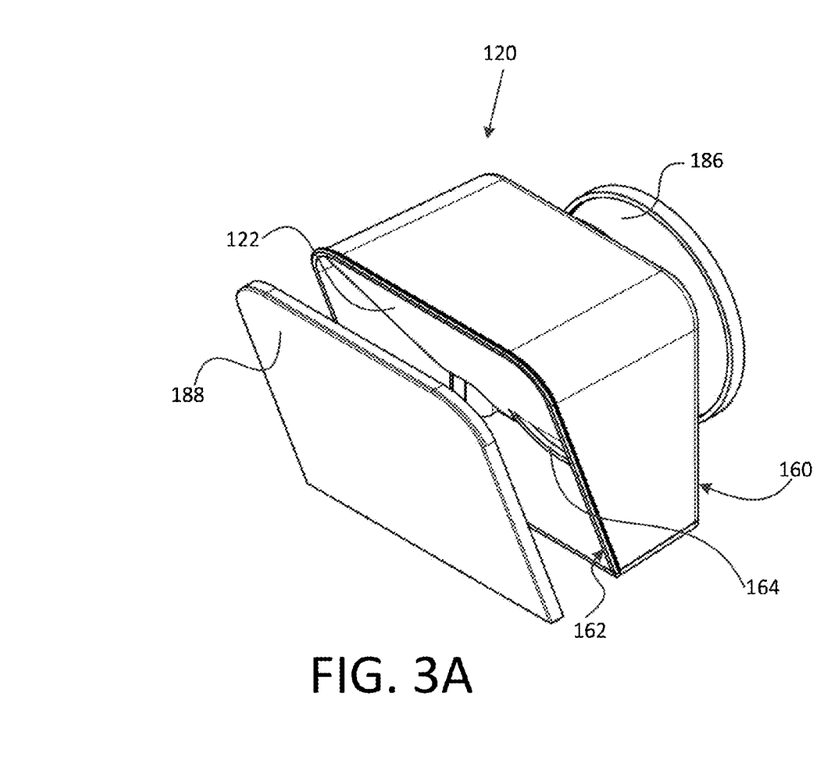
FIG. 3A is a perspective view of the teleprompter of FIG. 2A, shown with front and back covers removed, according to one or more embodiments of the present disclosure.
Figure 3B:
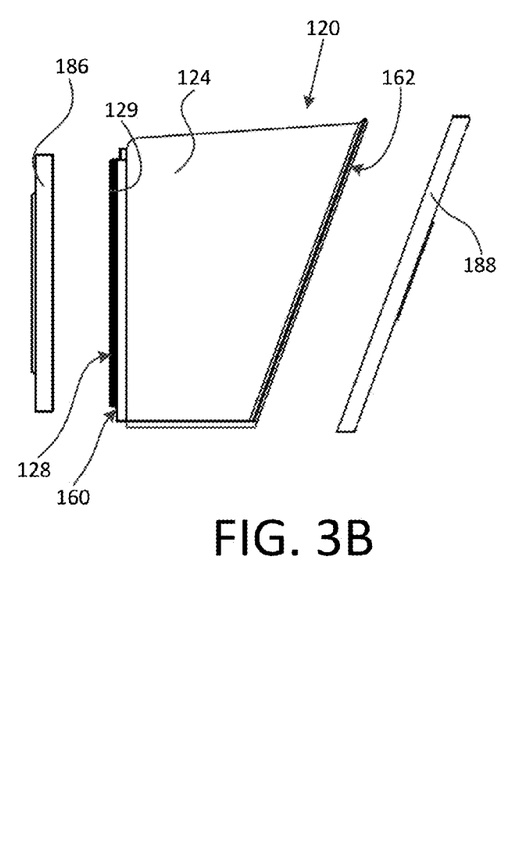
FIG. 3B is a side view of the teleprompter of FIG. 3A, according to one or more embodiments of the present disclosure.

Referring to FIGS. 3A and 3B, in some implementations, the teleprompter 120 further includes a proximal end cap 186 and a distal end cap 188. When the teleprompter 120 is not removably coupled to the camera 110, not in use, and the shelf 172 is in a stored position against the cover 124 as shown, the proximal end cap 186 can be removably coupled to the teleprompter 120 over the through aperture 164 of the proximal open end 160 and the distal end cap 188 can be removably coupled to the teleprompter 120 over the through aperture 166 of the distal open end 162 to fully enclose the space 190. In the stored position, the shelf 172 circumferentially or peripherally encloses the space 190 defined by the cover 124. In some implementations, the proximal end cap 186 may be sized and shaped to complementary engage the camera interface 128 of the cover 124 and thus cover the through aperture 164. In some implementations, with the shelf 172 in the stored position, the distal end cap 188 may cover, envelop, or abut against at least a portion of the shelf 172 to fully enclose the distal end cap 188. The proximal end cap 186 and the distal end cap 188, when removably coupled to the teleprompter 120, help to protect the mirror 122 and the adjustment mechanism 170, and prevent contaminants from entering and disrupting operation of the teleprompter 120. In this manner, the teleprompter 120 can function as a self-contained, enclosed unit when not in use for easy and protected storage or transport. When use of the teleprompter 120 is desired, the proximal end cap 186 and the distal end cap 188 can be removed from the teleprompter 120. In some implementations, when the teleprompter 120 remains removably coupled to the camera 110, just the distal end cap 188 can be removably coupled to the teleprompter 120.

The mobile device 130 can be any of various mobile devices known in the art. For example, in some implementations, the mobile device 130 is one of a smartphone, tablet, laptop, or other electronic device having a display and capable of executing a software program to display script on the display. According to certain implementations, the display 132 of the mobile device 130 has a maximum diagonal dimension that is equal to or less than about 7 inches. Accordingly, the teleprompter 120 facilitates the use of smaller, highly portable, mobile devices, such as smartphones, to display and scroll script. The software program is configured to, among other features, run a script presentation on the display 132 of the mobile device 130. Moreover, the software program manages and scrolls the scripts on the display to further simplify and improve the portability of the teleprompter system 100. In some implementations, the software program is implemented as a module of the mobile device 130. The module facilitates the importing, editing, and managing of scripts for display on the mobile device 130. Generally, the module is configured to scroll a script below the mirror 122 by displaying a mirrored image of the scrolling text in order to allow the user to read the scrolling script on the mirror 122 as the script advances. The module may also promote the customization of the display of the script by allowing user-control of various settings, such as text size, scroll speed, text color, text font, background color, margins, and the like. Moreover, the module may support automated or external control devices, such as a Bluetooth keyboard or remote.

Figure 7:
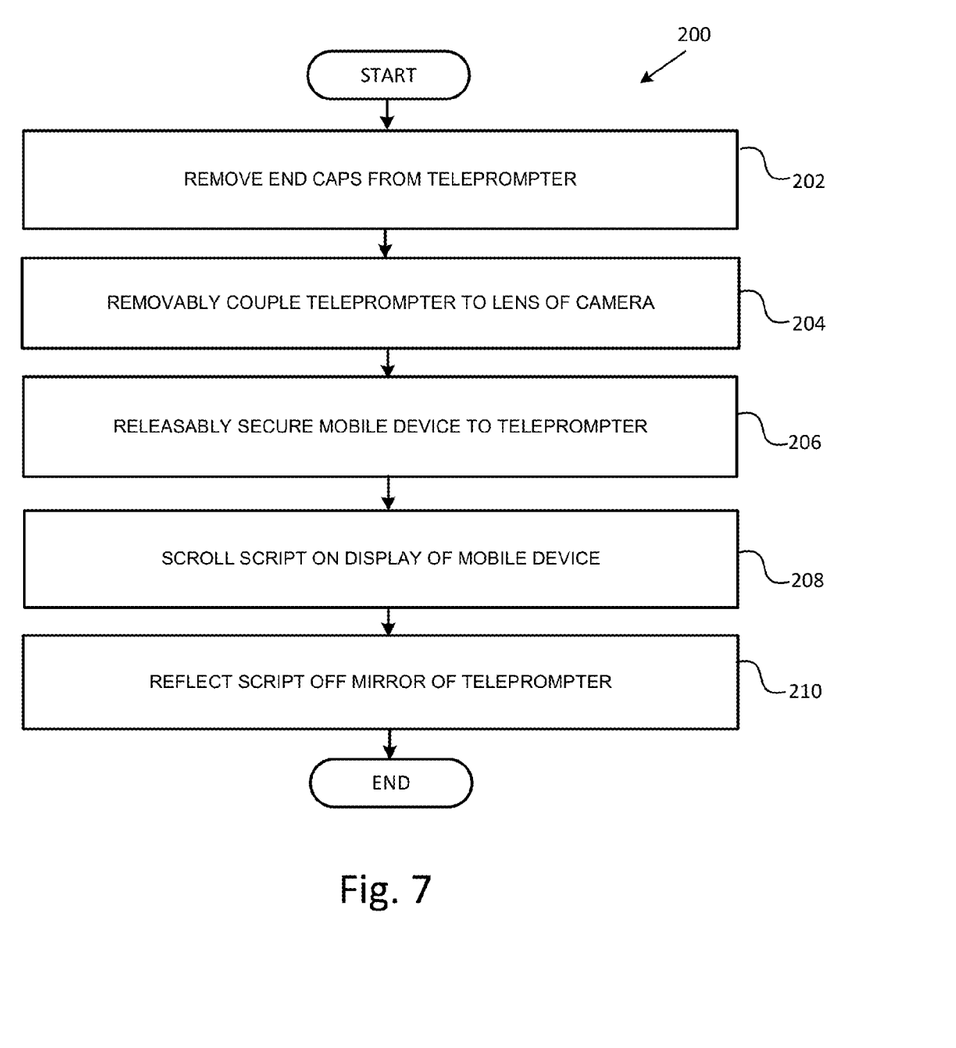
FIG. 7 is a schematic flow chart diagram of a method of teleprompting script to a user, according to one or more embodiments of the present disclosure.

Referring to FIG. 7, a method 200 of teleprompting script to a user is disclosed. The method 200 includes removing end caps from the teleprompter at 202. Additionally, at 204, the method 200 includes removably coupling the teleprompter to the lens of a camera, which can be a handheld camera. Removably coupling the teleprompter to the lens of the camera can include directly coupling the teleprompter to the lens of the camera, such as via threaded engagement with threads of the lens of the camera. Alternatively, removably coupling the teleprompter to the lens of the camera can include indirectly coupling the teleprompter to the lens of the camera, such as via an adapter, between the teleprompter and the lens, that threadably engages threads of the lens of the camera and threadably engages threads of the teleprompter. The method 200 also includes releasably securing a mobile device to the teleprompter at 206. Furthermore, the method 200 includes scrolling script on the display of the mobile device at 208, when releasably secured to the teleprompter, and reflecting the script from the display off of a mirror of the teleprompter at 210.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As will be appreciated by one skilled in the art, aspects of the embodiments may be embodied as a system, method or apparatus (e.g., program product). Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As mentioned above, aspects of the embodiments are described above with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

The description of elements in each figure may refer to elements of proceeding figures. Like numbers refer to like elements in all figures, including alternate embodiments of like elements.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A teleprompter system, comprising:
    a handheld camera;
    a lens, coupled to the handheld camera, wherein the lens comprises first threads;
    a teleprompter, removably coupled to the lens;
    a mobile device, removably coupled to the teleprompter; and
    an adapter interposed between the lens and the teleprompter, wherein the adapter comprises second threads threadably engaged with the first threads of the lens and wherein the teleprompter is removably coupled to the adapter.

2. The teleprompter system according to claim 1, wherein the teleprompter is co-movably coupled with a portion of the lens such that the teleprompter moves with the portion of the lens as the portion of the lens moves relative to the handheld camera.

3. The teleprompter system according to claim 1, wherein the first threads of the lens are filter threads configured to threadably engage a filter of the lens.

4. The teleprompter system according to claim 1, wherein:
    the teleprompter comprises third threads;
    the adapter further comprises fourth threads;

and
the fourth threads of the adapter are threadably engaged with the third threads of the teleprompter.

5. The teleprompter system according to claim 1, wherein the handheld camera is one of a digital single lens reflex (SLR) camera or a digital mirrorless camera.

6. The teleprompter system according to claim 1, wherein the teleprompter comprises:
a cover;
a mirror, fixedly retained within the cover; and
a mobile device mount, adjustably movably coupled with the cover to clamp the mobile device between the cover and the mobile device mount.

7. The teleprompter system according to claim 1, wherein the mobile device comprises a display that has a maximum diagonal dimension equal to or less than about seven inches.

8. The teleprompter system according to claim 1, wherein the teleprompter has maximum dimensions equal to or less than about 15×12×12 cm.

9. A teleprompter, for removably coupling with a handheld camera and a mobile device, the teleprompter comprising:
a cover, partially peripherally enclosing a space and comprising a proximal open end and a distal open end opposite the proximal open end;
a mirror, located within the space between the proximal open end and the distal open end; and
a mobile device mount, adjustably movably coupled with the cover to fully peripherally enclose the space;
wherein:
the mobile device mount is movable between an open position and a closed position;
in the open position, the mobile device is insertable between the cover and the mobile device mount; and
in the closed position, the mobile device, inserted between the cover and the mobile device mount, is clamped by the cover and the mobile device mount.

10. The teleprompter according to claim 9, wherein:
the mobile device mount comprises a shelf, defining a flat surface;
the mobile device mount further comprises an adjustment mechanism;
the mobile device mount is configured to concurrently maintain an orientation of the flat surface relative to the mirror and move the shelf toward the cover in a first direction parallel to the proximal open end of the cover to locate the mobile device mount in the closed position; and
the mobile device mount is configured to concurrently maintain an orientation of the flat surface relative to the cover and move the shelf away from the cover in a second direction, opposite the first direction, parallel to the proximal open end of the cover to locate the mobile device mount in the open position.

11. The teleprompter according to claim 10, wherein the adjustment mechanism comprises:
at least one rod, non-movably fixed to the shelf; and
at least one rail, non-movably fixed to the cover;
wherein at least the one rod is retained within and movable along at least the one rail.

12. The teleprompter according to claim 9, further comprising:
a proximal end cap removably coupleable with the proximal open end; and
a distal end cap removably couplable with the distal open end;
wherein when removably coupled with the proximal open end and the distal open end, respectfully, the proximal end cap and distal end cap fully enclose the space.

13. The teleprompter according to claim 12, wherein:
the mobile device mount comprises a shelf, configured to support the mobile device thereon; and
when the mobile device mount fully peripherally encloses the space, the distal end cap receives at least a portion of the shelf when the distal end cap is removably coupled with the distal open end of the cover.

14. The teleprompter according to claim 9, wherein the proximal open end of the cover comprises a camera interface, configured to directly interface with a lens coupled to the handheld camera.

15. The teleprompter according to claim 14, wherein the handheld camera interface of the proximal open end of the cover comprises second threads, threadably engageable with first threads of the lens.

16. The teleprompter according to claim 9, further comprising an adapter, comprising third threads, wherein:
the proximal open end of the cover is removably coupleable to the adapter; and
the third threads of the adapter are threadably engageable with first threads of a lens coupled to the handheld camera.

17. A method of teleprompting script to a user, the method comprising:
removably coupling a teleprompter to a lens of a handheld camera via threaded engagement with threads of the lens of the handheld camera;
releasably securing a mobile device to the teleprompter;
scrolling script on a display of the mobile device; and
reflecting the script, from the display, off of a mirror of the teleprompter.

18. A teleprompter system, comprising:
a handheld camera;
a lens, coupled to the handheld camera;
a teleprompter, removably coupled to the lens; and
a mobile device, removably coupled to the teleprompter wherein:
the lens comprises first threads;
the teleprompter comprises second threads; and
the second threads of the teleprompter are threadably engaged with the first threads of the lens.

* * * * *